J. M. GROVE.
FILTERS FOR CISTERNS.

No. 178,630. Patented June 13, 1876.

WITNESSES;
E. C. Whitney
J. S. Long

INVENTOR.
Joseph M. Grove.
Per E. Brink his Atty.

UNITED STATES PATENT OFFICE.

JOSEPH M. GROVE, OF INDIANAPOLIS, INDIANA.

IMPROVEMENT IN FILTERS FOR CISTERNS.

Specification forming part of Letters Patent No. 178,630, dated June 13, 1876; application filed March 14, 1876.

*To all whom it may concern:*

Be it known that I, JOSEPH M. GROVE, of Indianapolis, county of Marion, State of Indiana, have invented a new and useful Improvement in Filter for Cisterns, of which the following is a description, reference being had to the accompanying drawings.

My invention consists in the construction and arrangement of a filter and its connection with a cistern, whereby I am enabled to deposit all dirt, or mud, or other foreign substances, in one compartment of the filter, which can be readily cleaned, and also allow the water to freely filter through gravel and other filtering substances in the other compartment of the filter before it is allowed to enter the main cistern.

Figure 1:
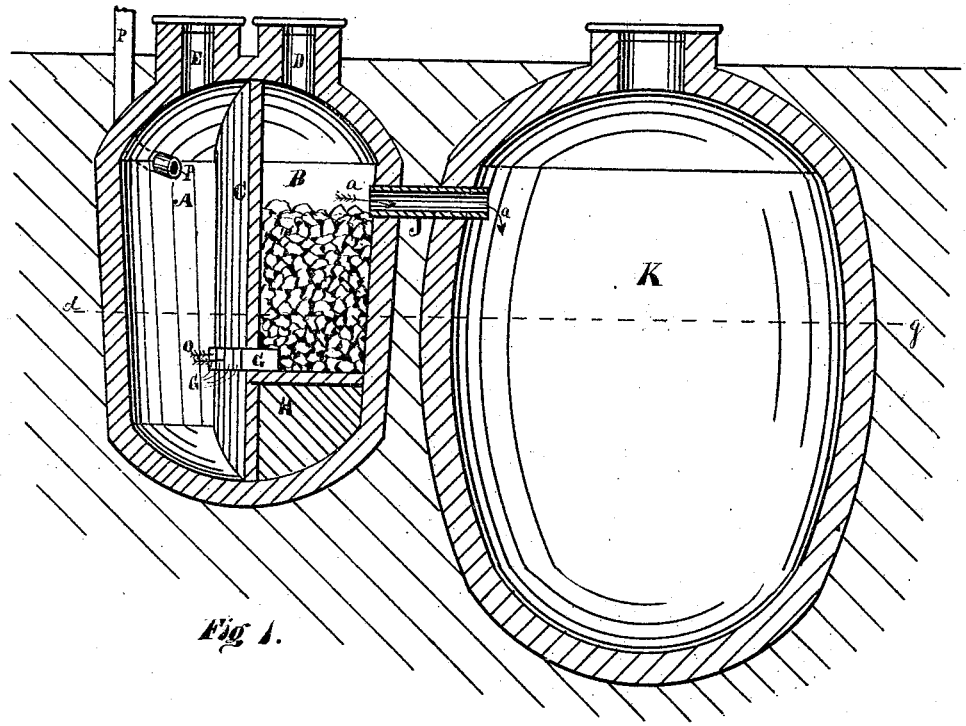
Figure 2:
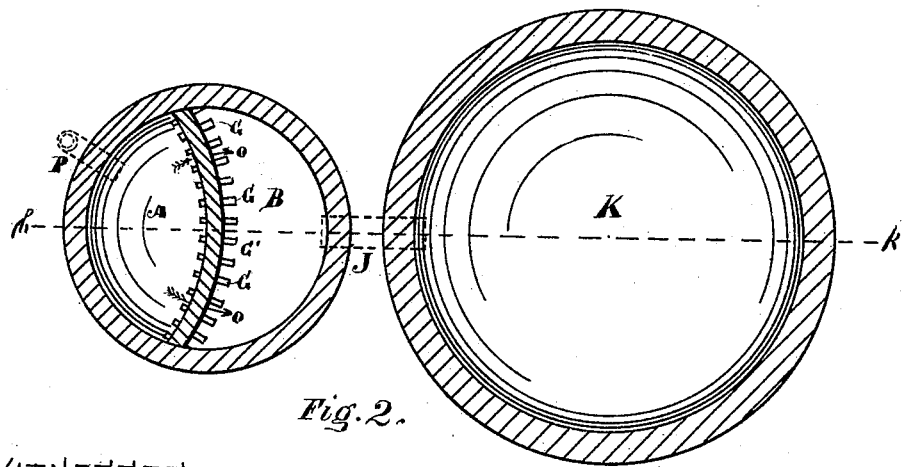

Figure 1 represents a sectional view of my improved filter and a cistern, taken through the line $h\,k$ of Fig. 2. Fig. 2 is a cross-section of the same taken through the line $d\,g$ of Fig. 1.

A B represents the filter-chamber, and is built of brick, wood, or other suitable material, and is provided with a curved partition, C, which divides the main chamber into two compartments, A B. The compartment A is designed to first receive the water from the spout P. The lower part of the filtering-compartment B is raised or filled up as shown at H, and the central partition C is perforated with openings formed by bricks G, placed edgewise, with a space, G', between each of them, as shown in Fig. 2, on top of the raised part H, the design of which is to let the water pass from chamber A to chamber B at the bottom of the chamber B, but some distance above the bottom of chamber A, as will hereafter be described. The chamber B above the raised bottom H is filled with gravel, charcoal, or other filtering material, as shown in Fig. 1. Near the upper part of the chamber B is a pipe, J, which forms a connection between the filtering-chamber B and the main cistern K, as shown in Fig. 1. At the top of the filtering-cistern are arranged two openings, E D.

The opening E leads into the water-compartment A, and the opening D into the filtering-compartment B, and are designed to be used for cleaning the filterer.

The water first enters the chamber A by means of the pipe P, and as the water rises above the openings G' in the partition C, then it begins to filter upward through the filtering material in the chamber B until it rises high enough to pass through the pipe J in the direction of the arrows $a\,a$ into the main cistern K, where it is deposited for further use.

The object of having the openings G' arranged above the bottom of the chamber A is to allow the dirt and other foreign matter to settle there, and is of sufficient capacity to hold the accumulation of months without cleaning.

When it becomes necessary to clean out the filter-chamber, the water is first removed from chamber A; then the accumulation of foreign matter is removed, after which, by pouring clean water into the filtering-chamber from above, the filtering material is washed, and the dirt is conveyed back through the openings G' in the partition C into the water-chamber A, where it can be removed, thus obviating the necessity of taking out the filtering material, which is a great saving of time, trouble, and expense.

What I claim as new, and wish to secure by Letters Patent, is—

A filtering-cistern constructed of any suitable material, and divided into two compartments, A and B, by a perforated partition, C, said perforations being located at a distance above the bottom of A, and at the bottom of B, in the manner shown, and for the purposes set forth and described.

In testimony whereof I have signed my name to this specification in the presence of two subscribing witnesses.

JOSEPH M. GROVE.

Witnesses:
E. O. FRINK,
E. C. WHITNEY.